(12) United States Patent
Petersen et al.

(10) Patent No.: US 8,824,099 B2
(45) Date of Patent: Sep. 2, 2014

(54) DISK CLAMP HAVING UNIFORM CLAMPING LOAD AND INDEX MARK

(75) Inventors: Frederic C. Petersen, Santa Barbara, CA (US); Ryan J. Schmidt, Santa Barbara, CA (US); Paul W. Smith, Santa Barbara, CA (US); Adam D. Sutton, Pleasanton, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 0 days.

(21) Appl. No.: 13/445,733

(22) Filed: Apr. 12, 2012

(65) Prior Publication Data

US 2013/0272108 A1 Oct. 17, 2013

(51) Int. Cl.
*G11B 17/022* (2006.01)

(52) U.S. Cl.
USPC ........................................ 360/99.12

(58) Field of Classification Search
CPC .. G11B 17/038; G11B 17/02; G11B 17/0287; G11B 25/043; G11B 17/0284
USPC ........................... 360/98.08, 99.12
See application file for complete search history.

(56) References Cited

U.S. PATENT DOCUMENTS

| | | | |
|---|---|---|---|
| 5,274,517 A | 12/1993 | Chen | |
| 5,528,434 A | 6/1996 | Bronshvatch et al. | |
| 5,822,151 A * | 10/1998 | Albrecht et al. | 360/98.08 |
| 5,880,906 A | 3/1999 | Lindrose | |
| 6,483,661 B1 | 11/2002 | Martin et al. | |
| 6,549,367 B1 | 4/2003 | Joshi et al. | |
| 6,850,389 B2 | 2/2005 | Drake et al. | |
| 7,630,171 B2 * | 12/2009 | Lee et al. | 360/99.12 |
| 7,922,418 B2 | 4/2011 | Baker et al. | |
| 8,305,708 B2 * | 11/2012 | Tacklind | 360/99.12 |
| 8,358,484 B2 * | 1/2013 | Nagai et al. | 360/99.12 |
| 2002/0024762 A1 * | 2/2002 | Renken | 360/99.12 |
| 2007/0253102 A1 * | 11/2007 | Abdul Hameed | 360/99.08 |
| 2009/0268342 A1 * | 10/2009 | Kim et al. | 360/99.12 |
| 2010/0220412 A1 * | 9/2010 | Nagai et al. | 360/133 |
| 2011/0128647 A1 * | 6/2011 | Gauzner et al. | 360/75 |

FOREIGN PATENT DOCUMENTS

| | | | |
|---|---|---|---|
| JP | 11328834 A | * | 11/1999 |
| JP | 2003331493 A | * | 11/2003 |
| JP | 2008282480 A | * | 11/2008 |
| JP | 2009271988 A | * | 11/2009 |
| KR | 2003021678 A | * | 3/2003 |

OTHER PUBLICATIONS

Wikipedia, Boss (engineering), http://en.wikipedia.org/wiki/boss (engineering); 1 pg. Jan. 6, 2012.
Wikipedia, Coining (metalworking), http://en.wikipedia.org/wiki/coining (metalworking); 1 pg. Jan. 6, 2012.

* cited by examiner

*Primary Examiner* — Will J Klimowicz

(57) ABSTRACT

A disk clamp for clamping a number of magnetic hard disks within a disk drive has a plurality of balance weight holes and a coined index mark for use as a reference in balancing the hard disks after assembly. The disk clamp also has a coined profile located adjacent or around the balance weight holes in order to provide uniform circumferential clamp force by the disk clamp. The disk clamp has a profile that places the inner region of the disk clamp in the plastic deformation region at a certain specified clamping force at the center of the disk clamp.

9 Claims, 10 Drawing Sheets

DISK CLAMP HAVING UNIFORM CLAMPING LOAD AND INDEX MARK

BACKGROUND OF THE INVENTION

1. Field of the Invention

The present invention relates to disk drives and more specifically, to a disk clamp for a disk drive that provides a uniform clamping load.

2. Description of Related Art

Work stations, personal computers and laptop computers require disk drives that provide a large amount of data storage within a minimal physical area. A disk drive typically includes one or more hard disks that are rotated at a constant high speed by a spindle motor. Generally, disk drives operate by positioning a transducer or read/write head over respective tracks on the disks. The information is written to and read from tracks on the disks through the use of an actuator assembly which rotates during a seek operation. The actuator is coupled to control electronics which control the positioning of the actuator and the read/write functions of the transducer. A typical actuator assembly includes a plurality of actuator arms which extend towards the disks with one or more flexures extending from each of the actuator arms. Mounted at the distal ends of each of the flexures is a head which acts as an air bearing enabling the head to fly in close proximity above the corresponding surface of the associated disk. The demand for increasing density of information stored on these disks is becoming greater and greater for a multitude of reasons. The increase of multi-user and multi-tasking operating system work stations which provide an operating environment requiring the transfer of large amounts of data to or from the hard disks, large application programs, the popularity of notebook and laptop computers and the continuing trend toward higher performance microprocessors all contribute to this end. The structural design of these systems is also continually shrinking, requiring hard disk drives having high capacity storage capability while occupying a minimal amount of space within the system.

In order to accommodate these demands, there is a need for smaller hard disk drives which have increased storage capacity. To read this more densely stored information, engineers have decreased the gap fly height between the heads and the disks. Reducing the gap fly height leads to increased contact between a head and the data portion of the disk during operation of the disk drive. Nevertheless, there has been an industry wide push to reduce the height at which transducers are maintained over the disk surface without actually contacting the disk surface.

When a transducer flies over a rotating disk, the flying height tends to fluctuate slightly above and below a normal flying height because the disk surface itself is not flat. At lower flying heights the variation in the fly height may cause the transducer to contact the disk surface. This intermittent contact, if repeated, can damage the transducer or the disk and may cause drive failures.

In conventional disk drives, a stack of disks is provided on a cylindrical hub of a spindle motor. A disk clamp is provided on top of the stack of disks on the hub. The clamp has a larger radius than that of the hub so that the outer diameter of the clamp is in contact with the top disk. A plurality of screws, or a single screw, fit through holes located in the disk clamp. These screws (screw) are threaded into bores in the hub. When a screw is tightened, the force applied to the midsection of the disk clamp is transferred to the outer circumference of the disk clamp which contacts the disk surface. This force secures the disks to the spindle motor hub. The disks must be secured under considerable force in order to prevent any slippage of one or more disks in the presence of mechanical shocks. Even very slight slippage of a disk within a drive could result in mechanical misalignment of the transducer which could result in data transfer errors or failure.

Disk clamp design is quite critical in high performance disk drives. Ideally, the disk clamp provides a uniform clamping force along its clamping surface to avoid disk distortion. The disk clamp must be designed to reduce overall clamp force variation. Minimizing height variations resulting from component tolerance and differential thermal expansion will result in less total clamp force variation.

Spindle motor assemblies often utilize a rotating spindle hub journaled to a non-rotatable spindle shaft. A disk clamp is typically secured to the rotating spindle hub to exert a downward axial force on the mounted disks and disk spacers. Typically, the disk clamp exerts the downward force through a series of radially positioned screws torqued into the spindle hub. The radial positioning of the screws exerts a clamping force on the spindle at the periphery of the disk clamp in closer proximity to the mounted information storage disks and disk spacers. The positioning of the screws in the disk clamp causes the downward force to be exerted in a non-uniform manner. Non-uniform clamping force causes variations in the load force and as a result, causes, at least the top mounted information storage disk to be physically distorted. Distortion of the top disk even by as little as 40 microinches can lead to operational errors during recording and reproduction of data on the information storage disk.

In a second type of spindle motor assembly, the spindle shaft and spindle hub portion both rotate about a bearing sleeve. In this arrangement a single screw is used to secure the disk clamp to the rotating spindle shaft. In order to develop a clamping force with a single screw similar to the force developed by a plurality of screws surrounding the non-rotatable shaft, it is necessary to apply a much higher torque to the single screw. This relative high torque leads to a number of problems, including over-stressing the spindle shaft bearing. These high torque related problems can damage the bearing and lead to failure of the spindle motor.

In spite of previous attempts, there is still a need to overcome the shortcomings of the traditional single screw disk drive spindle motor assembly as well as the multiple screw spindle shaft spindle motor assembly by providing a disk clamp that produces a uniform clamping load on the storage disks supported by the hub of the spindle motor.

SUMMARY OF THE INVENTION

The flatness and uniform circumferential clamp force of a disk clamp having balance weight holes is substantially improved by using a coined index mark on the disk clamp instead of the extra reference holes. The variation in circumferential clamp force caused by the plurality of balance weight holes is reduced to a minimum by adding a formed or coined profile adjacent to or around the weight holes, thereby either stiffening the clamp at the area of each weight hole, or softening the area between the weight holes. The disk clamp contains a circular coined profile at the innermost section of the disk clamp which causes this innermost section to be in the plastic region of the stress-strain curve for the disk clamp, at the specified clamping force.

BRIEF DESCRIPTION OF THE DRAWINGS

The exact nature of this invention, as well as the objects and advantages thereof, will become readily apparent from consideration of the following specification, in conjunction with the accompanying drawings, in which like reference numerals designate like parts throughout the figures thereof and wherein.

DETAILED DESCRIPTION OF THE PREFERRED EMBODIMENTS

Figure 1:
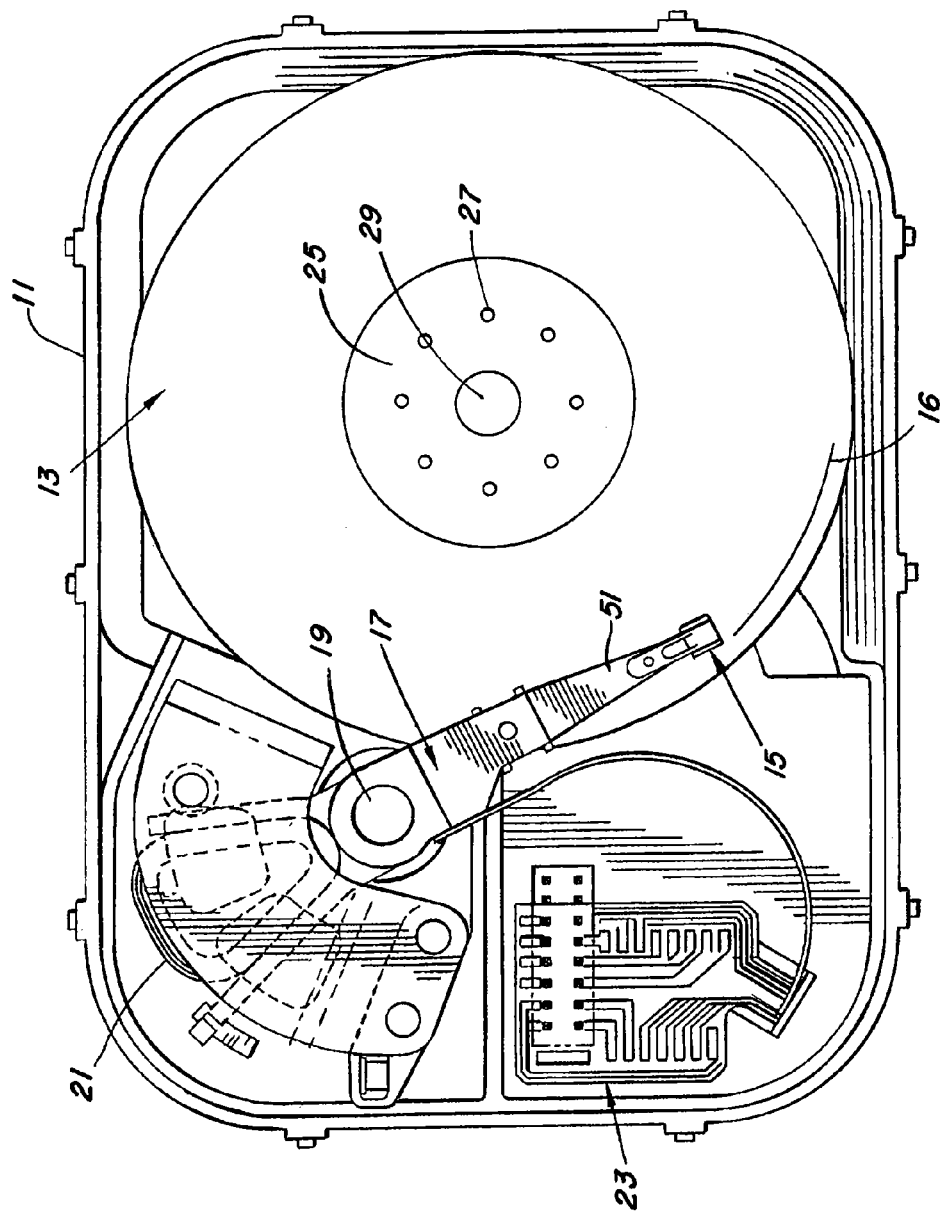
FIG. 1 is a top cut-away view of an assembly of a disk drive.

FIG. 1 represents a cut-away top view of a disk drive 11 having one or more hard disks 13 with each of the hard disks having information written in a series of data tracks 16 thereon. The disk drive 11 utilizes at least one transducer 15 for reading and writing information to the hard disk 13. The transducer 15 may be a conventional conductive element or a magneto-resistive element, for example. The transducer 15 is connected to an actuator arm 17. The movements of the actuator arm 17 are controlled by a voice coil motor 21 causing the arm to pivot about a pivot junction 19. A control circuit 23 is used to control the operation of the actuator arm 17 and other components (not shown) within the disk drive 11.

During a seek operation, for example, the track position of the head 15 is moved across the surface of the disk 13. The head 15 is connected to the actuator arm 17 by a flexure 51.

The hard disk 13 may be a single disk or a stack of disks. The hard disk 13 is connected to a spindle motor (not shown) by a disk clamp 25. According to the present invention, the disk clamp attaches the hard disk 13 to the hub of the spindle motor by a single screw 29. A plurality of balance weight holes 27 are located in the disk clamp 25, circumferentially spaced about the fastening screw 29.

The disk clamp 25 affixes the hard disk 13 to the hub of the motor by the force exerted by the fastening screw 29. During operation of the disk drive 11, the hard disk 13 is rotated by the motor, and the actuator arm 17 moves the transducer 15 across the surface of the hard disk 13 transferring data between the transducer 15 and the hard disk 13.

Figure 3:
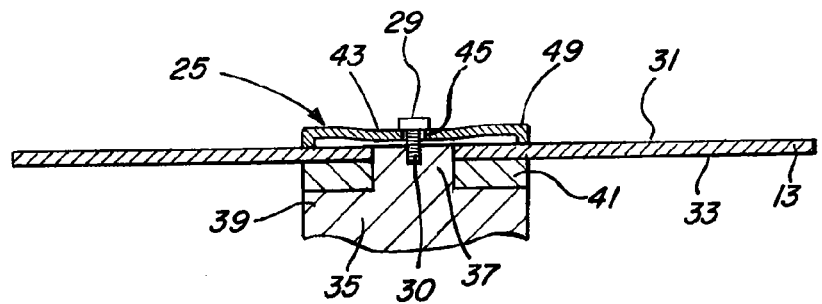
FIG. 3 is a cross-section of the disk clamp and drive motor hub assembly.
Figure 2:
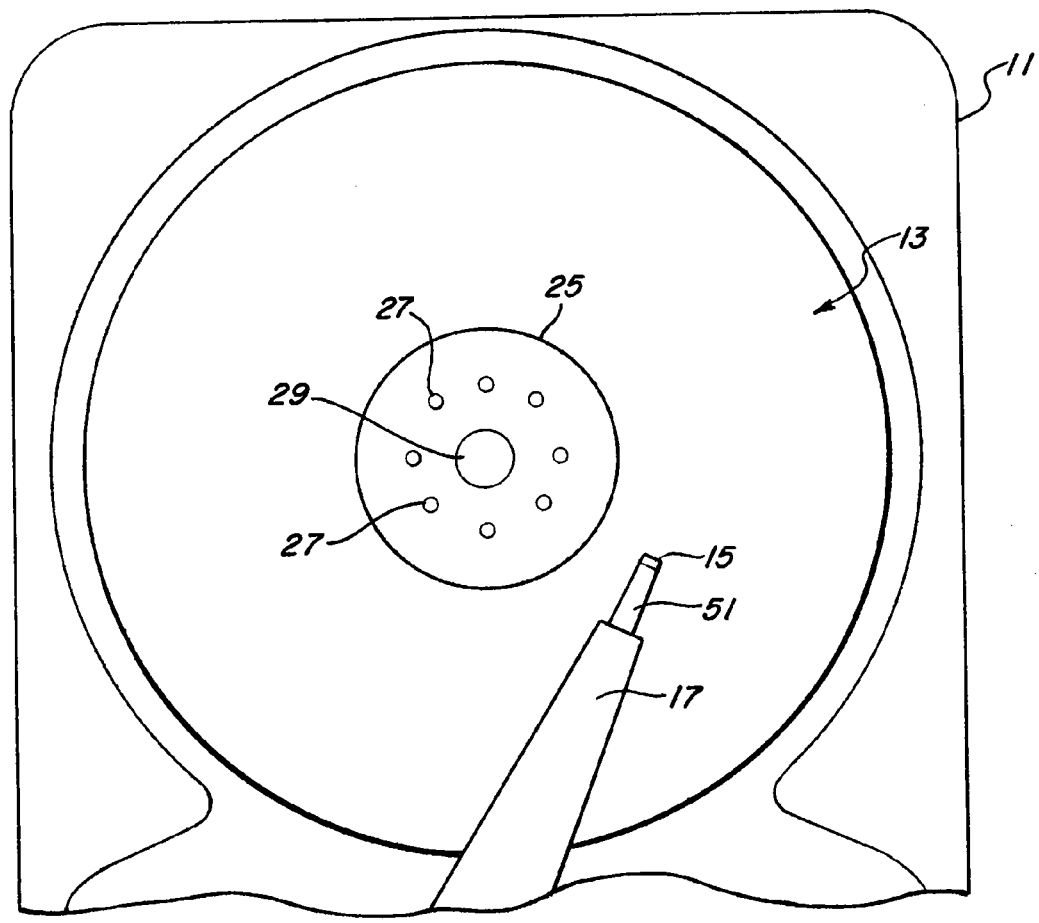
FIG. 2 is a top cut-away view of the disk stack in a disk drive.
Figure 4:
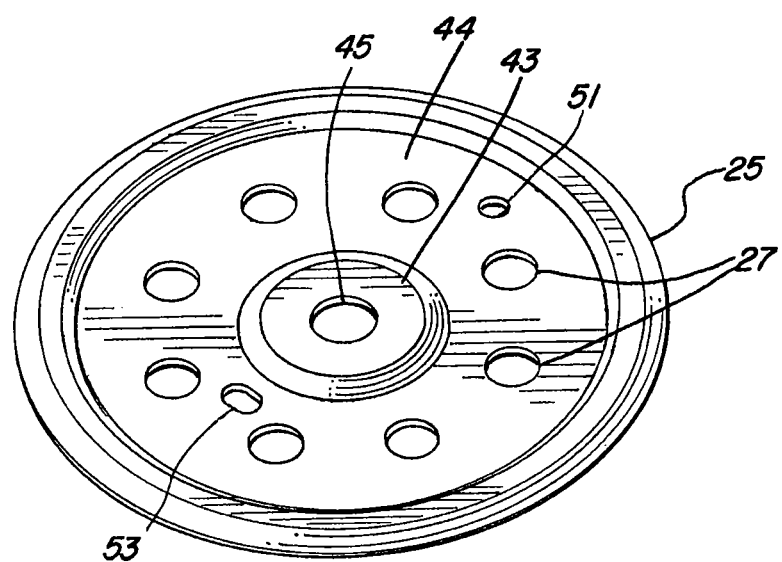
FIG. 4 is a perspective of a disk clamp.

Referring to FIGS. 2, 3 and 4, a spindle motor (not shown) carries the generally cylindrical hub 35 which has a cylindrical bottom flange 39 and a cylindrical head 37 extending upward from the flange 39. The hub head 37 defines a centrally located fastener bore 30. The flange 39, hub head 37 and fastener bore 30 are all preferably substantially concentric. It should be noted, however, that the hub may have many different configurations in accordance with the present invention. For example, the hub can include several circumferentially spaced fastener bores rather than a single centrally located fastener bore 30. The disk assembly illustrated by the disk 13 includes an annular spacer 41 that is seated on the hub 35 so that it extends around the hub head 37 and rests on the flange 39. It should be kept in mind that the present invention can be used without the spacer 41. Also in an embodiment where the disk drive includes multiple disks, a plurality of spacers 41 are used to separate each of the disks 13. The disk 13 is seated on the hub 35 so that it extends about the hub head 37 and rests on the spacer 41. The disk 13 has a lower data surface 33 and an upper data surface 31.

The disk pack assembly shown in FIG. 3 includes a disk clamp 25. Disk clamp 25 is also shown separately in FIG. 4. Disk clamp 25 is centrally located on the upper surface 31 of the disk 13. A rim 49 forms the periphery or outer diameter of the disk clamp 25. A concentrically located fastening hole 45 in the disk clamp defines a centrally located hole for insertion of a fastening screw 29.

It should be kept in mind that multiple circumferentially spaced fastener holes 45 may be utilized to match up with multiple fastener bores 30 in the hub head 37. The disk clamp 25 is preferably made of stainless steel, although it could be made of aluminum or other materials or alloys having similar desired characteristics.

Fastening screw 29 extends through the fastener hole 45 of the disk clamp 25 and into the fastener bore 30 in the hub 35. The fastening screw 29 engages the hub 35 and draws the midsection 43 of the disk clamp 25 downward beyond its normal resting position, thereby creating stress and a downward pressure at the rim 49. The rim 49 in turn applies a downward pressure on the upper surface 31 of disk 13, thereby holding the disk 13 securely in place on the hub 35.

Referring to FIG. 4, the fastening hole 45 is centrally located within the disk clamp 25 which is preferably formed as a circular member. A plurality of through holes 27 are circumferentially located about the concentrically located fastening hole 45 in the body of the disk clamp 25. A midsection 43 surrounds the fastening hole 45 inside the balance holes 27. Tooling holes 51, 53 are located in the body of the disk clam in the surface 44 between the midsection and outer diameter of the disk clamp. These holes are utilized as a marker for establishing a reference for placing weights in the balance weight holes 27 of the disk clamp for balancing the disk pack after assembly.

Every time a hole is placed in the body of a disk clamp 25, such as weight holes 27, and marker holes 53, 51, the clamping load characteristics of the disk clamp 25 are changed, as will be explained in greater detail hereinafter.

Figure 5:
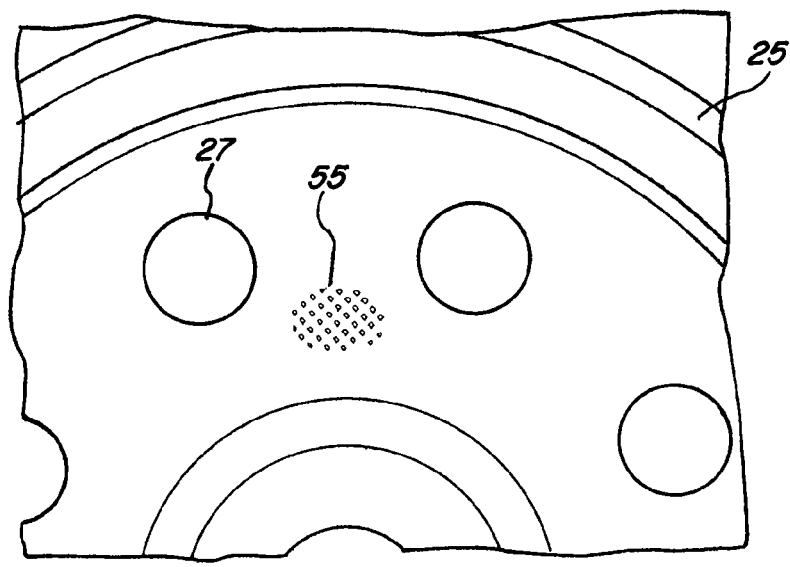
FIG. 5 is a top view of a section of a disk clamp illustrating one embodiment of the invention.
Figure 6:
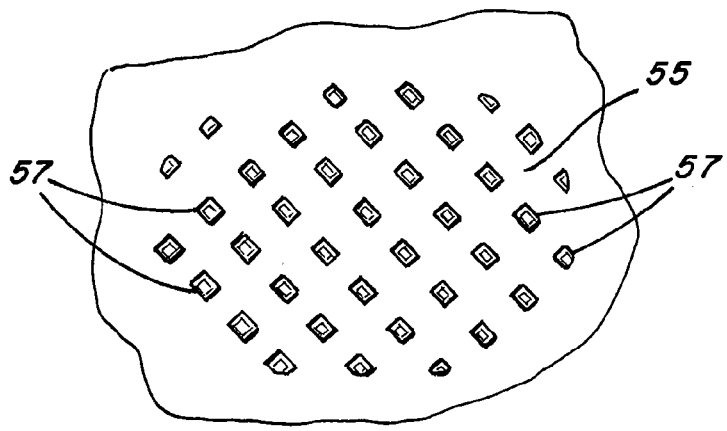
FIG. 6 is a close up view of a portion of the disk clamp of FIG. 5.
Figure 7:
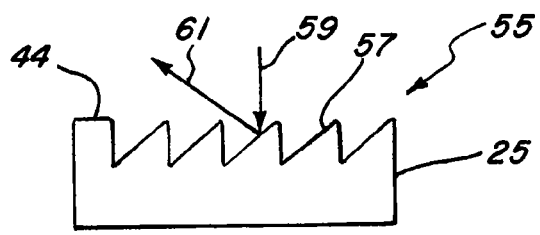
FIG. 7 is an illustration of the function of the reflecting surfaces shown in FIG. 6.

Reducing the number of holes in the body of the disk clamp 25 is desirable. Holes 53 and 51 can be eliminated if the reference marker shown in FIGS. 5, 6 and 7 is utilized. Instead of locating holes, a hatch pattern 55 can be metal formed (coined) into the surface of the disk clamp, in the area of the balance weight holes 27. Hatch pattern 55 can be coined into the disk clamp surface without affecting its flatness or the structural uniformity of its clamping load. The hatch pattern 55, as shown in FIGS. 6 and 7, is formed by slightly indenting small surface portions 57 at an angle to the upper surface 44 of the disk clamp. A light beam passing over the top surface 44, such as beam 59 produces a significant change in the reflected light signal 61, even though the pattern itself is barely visible to the eye.

The entire profile of the hatch pattern 55 may be any desired shape, but is preferably rounded, such as in an oval or circle, for example. The slanted surfaces 57 are preferably coined into the surface 44 of the disk clamp prior to heat treating of the clamp to a depth that is less than or equal to 10% of the total disk clamp thickness.

Utilizing the hatch pattern 55 instead of the through holes previously used to locate the placement of balance weights improves the clamping force uniformity of the disk. Every hole placed into the surface of the disk causes loss of stiffness in the disk clamp.

The detectability of the hatch pattern 55 using a light beam is significant. Tests conducted at 6000 rpm show the following results. For one complete revolution at a base line signal of 18 millivolts, the signal generated over the hatch pattern was a −177 millivolts measured at the approximate center of the pulse. The total signal change was equal to −195 millivolts with an approximate pulse width of 0.5 millisecond (msec).

The hatch pattern footprint location and its detailed geometry is easily changed without affecting the flatness or structural uniformity of the disk clamp. This is a considerable improvement over the use of through holes.

Figure 9:
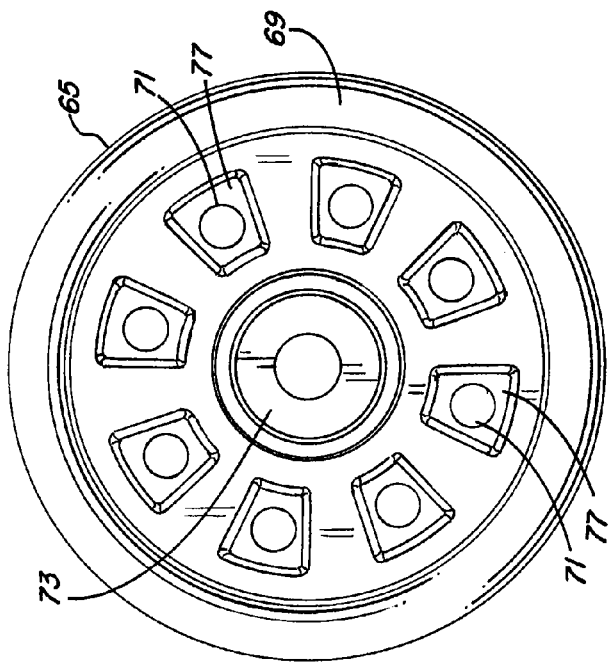
FIG. 9 is a bottom view of the disk clamp of FIG. 8.
Figure 8:
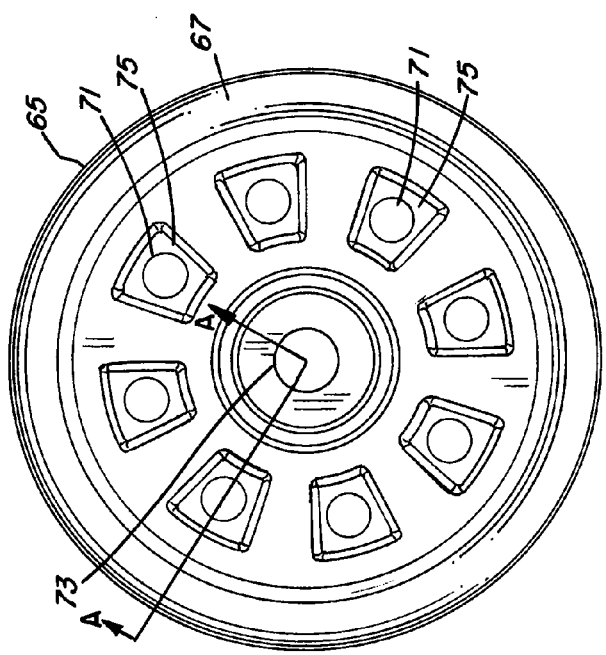
FIG. 8 is a top view of a disk clamp according to one embodiment of the invention.

Having eliminated locating holes 51, 53 in the disk clamp 25, as shown in FIGS. 8 and 9 for disk clamp 65, the balance weight holes 27 in the disk clamp 25 still remain and present a considerable obstacle to obtaining a uniform clamping load from the disk clamp. The balance weight holes 27 cannot be removed without losing the balance feature.

Figure 10:
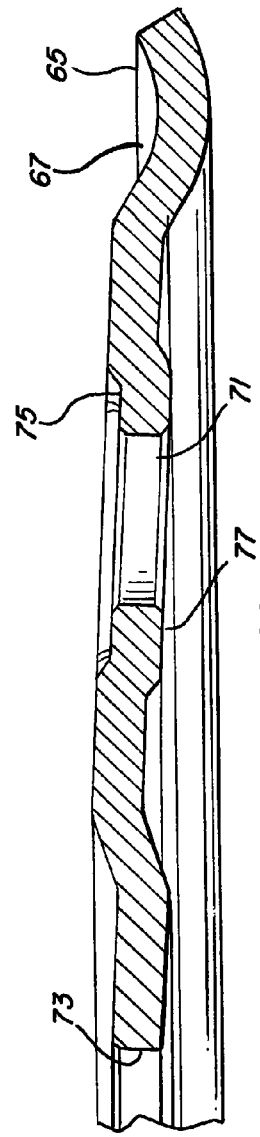
FIG. 10 is a sectional view of a portion of the disk clamp shown in FIG. 8.

Referring to FIGS. 8, 9 and 10, a preferred embodiment of the present invention is illustrated that evens out the circumferential disk clamp force in the presence of the balance weight holes 71.

Individual boss sections 75 are metal worked around each balance weight hole 71, either in the top surface or bottom surface, depending on the requirements of the disk clamp height and clearance requirements. These boss sections are formed early in the disk clamp manufacturing process, creating a non-continuous profile. The boss sections create a stiffness around each of the balance weight holes 71 that evens out the circumferential disk clamp force as will be further explained hereinafter.

The sides of each boss section are preferably collinear with a radial extension from the center 73 of the disk clamp 65. The tops of the boss sections 75 are all co-radial as are the bottoms of the boss sections 77.

The depth of forming of each boss section 75 is preferably between 10% to 30% of the thickness of the disk clamp 65 providing an offset that is between 0.01 and 0.015 inches.

FIG. 8, which shows the top surface of disk clamp 65, shows the boss sections 75 formed into the top surface. FIG. 9, the bottom surface of disk clamp 65, shows the bottom 77 of the boss sections 75.

FIG. 10 is a partial cross-section of the disk clamp 65 shown in FIG. 8 along A-A, indicating the formed-in depressed boss 75 in the top surface and the formed-in boss surface 77 in the bottom surface.

Figure 11:
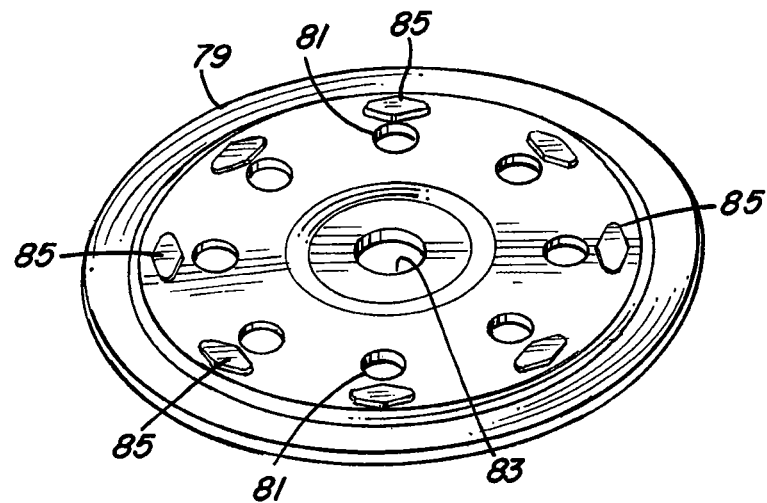
FIG. 11 is a top perspective view of a disk clamp showing an alternate embodiment of the invention.

Referring now to FIG. 11, an alternate embodiment for evening out the circumferential disk clamp force is illustrated. Disk clamp 79 has a plurality of balance weight holes 81 circumferentially surrounding a centrally located fastening hole 83. Profiles 85 are formed or extruded on the disk clamp surface. These profiles 85 are located along a same radial path as the balance weight holes, but do not surround the balance weight hole. The profiles may be located on the top or bottom surface of the disk clamp, depending on required clearances.

Figure 12:
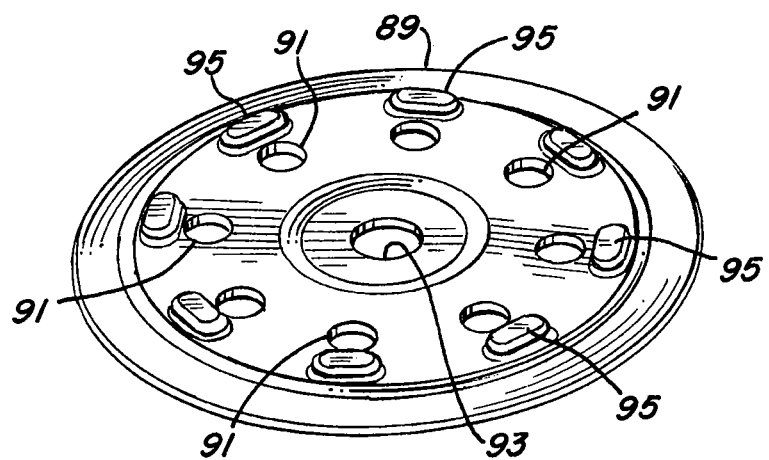
FIG. 12 is a top perspective top view of a disk clamp showing yet another embodiment of the invention.

FIG. 12 illustrates a disk clamp 89 that has formed or extruded profiles 95 of a different shape located along the same radial paths as the balance weight holes 91.

Figure 13:
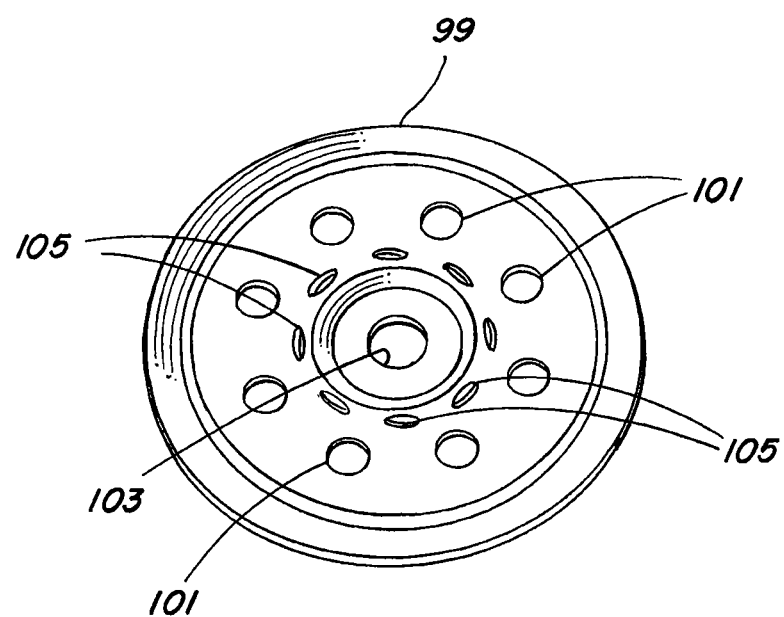
FIG. 13 is a top perspective view of a disk clamp showing yet another embodiment of the invention.

FIG. 13 illustrates yet another embodiment for evening out the circumferential disk clamp force in a disk clamp 99 that has balance weight holes 101. In this embodiment, a plurality of apertures 105 are cut in the disk clamp surface in the areas between the balance weight holes 101. Location of these apertures actually weaken the radial areas between the weight holes and thereby even out the circumferential clamping force of the disk clamp 99.

Figure 14:
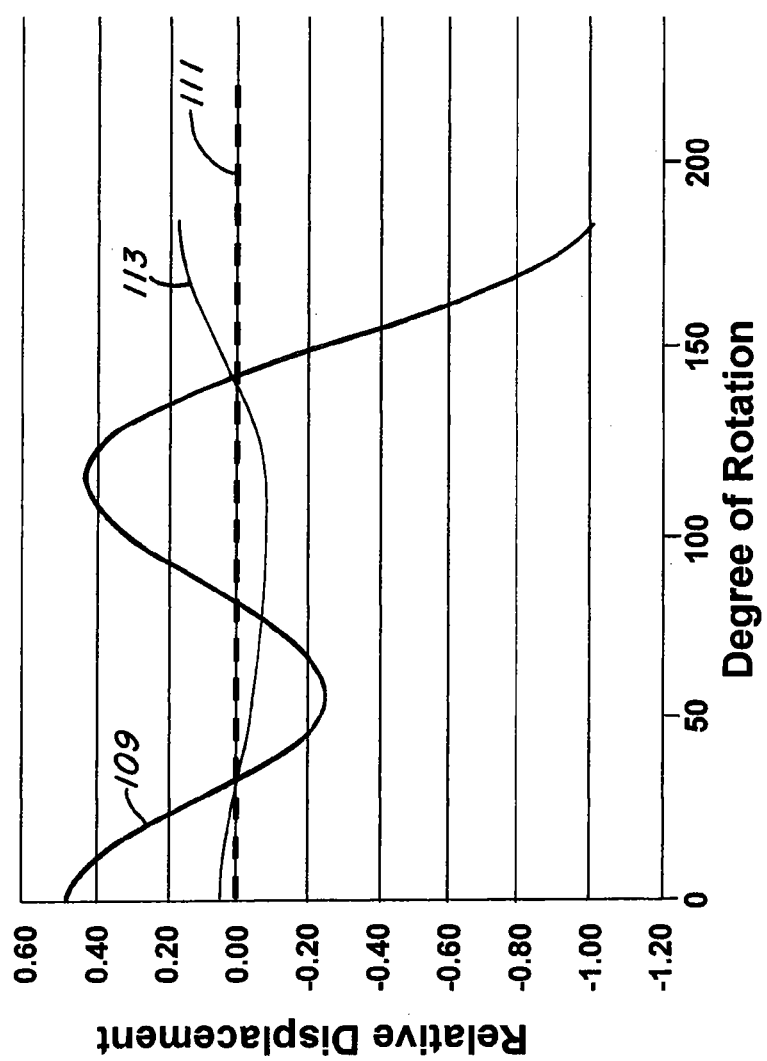
FIG. 14 is a graph illustrating disk displacement for different disk clamp configurations.

Refer now to FIG. 14, which illustrates the relative edge displacement of a top disk utilizing a variety of disk clamps. These graphs were generated after considerable testing and computer simulation by the inventors of the present application. Graph 109 illustrates a disk clamp with the standard eight weight holes in the disk clamp. As graph 109 illustrates, the relative displacement of the top disk through half its rotation varies considerably. This is an indication of an uneven circumferential disk clamp force being generated.

Graph 111 illustrates the optimal relative displacement of the top disk when a solid disk clamp, which does not contain any holes, and is not made from anisotropic material is utilized. The relative displacement is a constant.

The stainless steel material used to form disk clamps typically comes in a strip form, and is shipped as a large coil. To produce the strip material at the desired thickness, the steel is passed through a sequence of rollers. The rolling process tends to elongate the material more than it increases its width, and thus causes more strain-hardening in the long direction of the strip. This in turn results in different mechanical properties in the rolling direction than in the direction perpendicular to it. This anisotropy of the material affects the performance of the finished disk clamp.

When a round disk clamp is formed from this material, the load produced by the clamp on the underlying disk surface, when the clamp is installed, is dependent on the elastic modulus of the material from which the clamp is made. Ideally, the clamp force would be uniform around the periphery of the disk clamp where it contacts the disk. Due to the aforementioned material anisotropy, the clamp force in the installed condition is not uniform. This produces an undesirable bending of the disk.

The current invention involves precision forming features in the disk clamp to compensate for variations in stiffness around the periphery of the clamp. These features can also be customized to vary the geometric stiffening in such a way as to compensate for the material anisotropy, resulting in circumferentially uniform clamping force, and a flat disk.

Graph 113 illustrates the relative displacement of the top disk utilizing a disk clamp containing the eight balance weight holes which have been compensated for by one of the formed structures shown in FIGS. 8-13. Although the relative displacement of the top disk is not flat, it is a considerable improvement over prior art disk clamps with weight holes.

Figure 20:
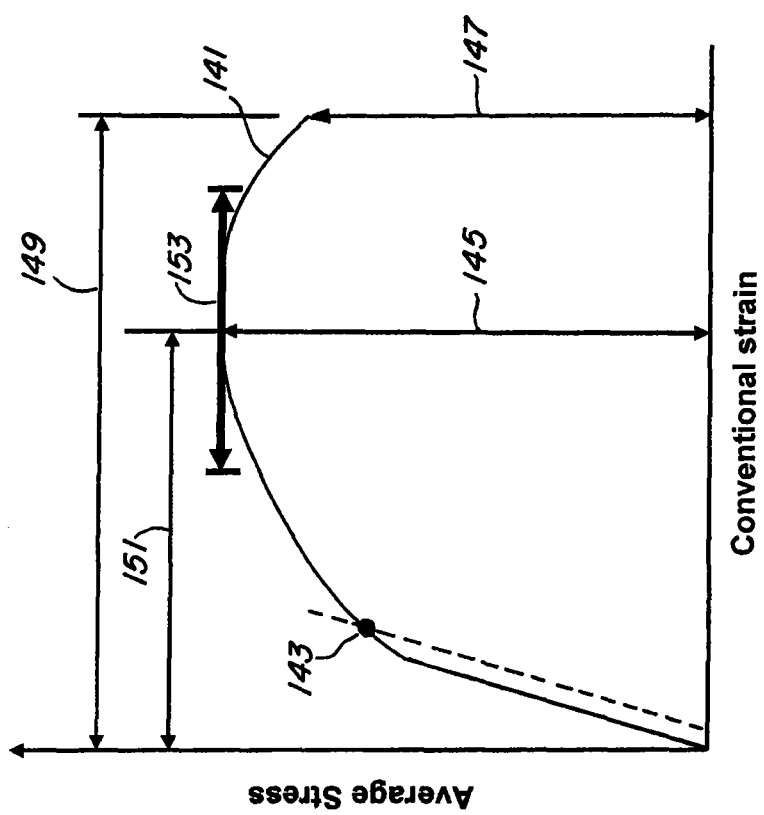
FIG. 20 is a graph illustrating a feature of the embodiments shown in FIGS. 15-19.

FIG. 20 illustrates a standard stress/strain curve for a material such as stainless steel or aluminum. As the strain is increased from 0, the stress in the material rises rapidly to its yield strength, at point 143 on the curve. If the strain is increased beyond point 143, the stress rises at a lower rate, until it goes into the plastic region. At a certain strain 151, there is a point of maximum stress 145. The point of maximum stress 145 is at about the middle of the plastic region 153. Before and after the point of maximum stress 145, an increase in strain does not applicably increase stress. After the plastic, stress region 153, the stress will decrease 141, as strain is increased to the fracture point 147.

The current invention provides a disk clamp to have its nominal specified clamp force at about the maximum stress point 145 in the plastic region 153. Tightening of the fastening screw around this point 145 will not increase stress in the disk clamp and will reduce overall clamp force variation.

To provide a disk clamp that operates in the plastic deformation region 153 of the stress/strain curve, a unique coined profile for the disk clamp has been created. The coined profile may vary as illustrated in FIGS. 15-19. FIGS. 15-19 illustrate in cross-section the profile coined into the disk clamp 115. However, it should be remembered that the coined profile illustrated in all cases is circular, surrounding completely the centrally located fastening hole 119 in disk clamp 115 or multiple screw holes, when multiple screw holes are used. FIGS. 15-19 show variations that are possible in the formation of a profile that will provide a disk clamp that is in the plastic region at the nominal clamp force for the fastening screw.

Figure 15:
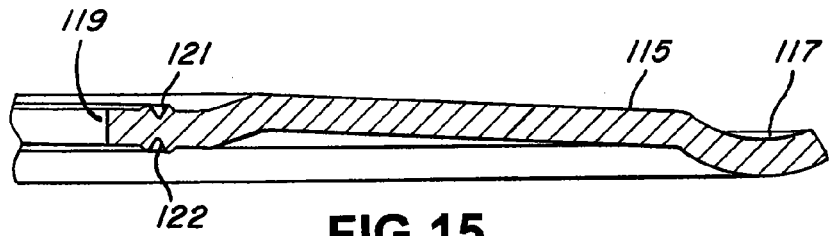
FIG. 15 is a partial cross-section of a disk clamp showing another embodiment of the invention.

FIG. 15 illustrates the use of V-shaped profiles that are formed into the top and bottom face of disk clamp 115. Both the top profile 121 and bottom profile 122 are collinear.

Figure 16:
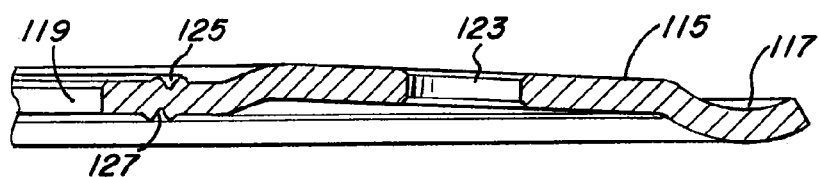
FIG. 16 is a partial cross-section of a disk clamp showing an alternative embodiment of the invention.

FIG. 16 illustrates that the top coined, V-shape 125 need not be collinear with the bottom V-shape 127.

Figure 17:
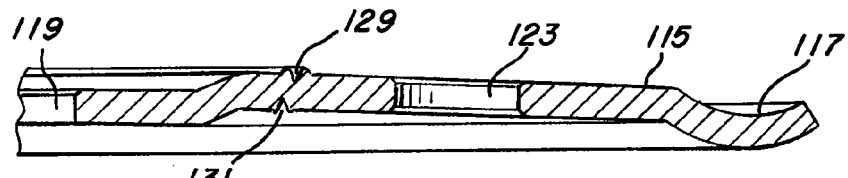
FIG. 17 is a partial cross-section of a disk clamp showing yet another alternative of the invention.

FIG. 17 illustrates that the location of the coined V-shaped profile 129 in the top, need not be collinear with the V-shaped profile 131 in the bottom, and both are located at a greater distance from the central fastener hole 119 than shown in FIGS. 15 and 16.

Figure 18:
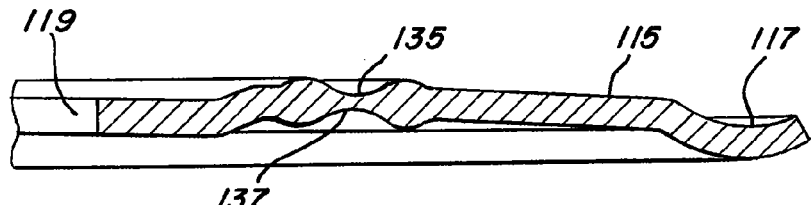
FIG. 18 is a partial cross-section of a disk clamp showing another alternative of the present invention.

FIG. 18 illustrates the use of a U-shaped coined profile 135 in the top and a U-shaped coined profile 137 in the bottom. Both profiles are collinear. Both profiles may be located at a greater distance from the central fastening hole 119.

Figure 19:
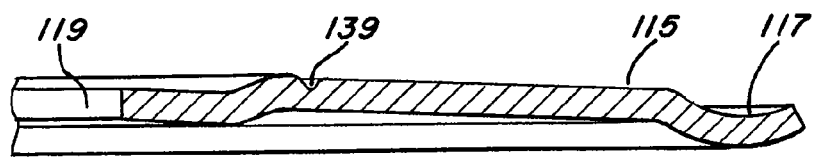
FIG. 19 is a partial cross-section of a disk clamp showing yet another alternative of the present invention.

FIG. 19 illustrates the use of a single coined V-shaped profile 139 in the top that may be sufficiently deep to cause the disk clamp to operate in the plastic region at the target clamping force.

It should be understood that the foregoing disclosure describes only the preferred embodiments of the invention. Various modifications may be made therein without departing from the spirit and scope of the invention as set forth in the claims to provide a disk clamp that has a uniform clamping load, creating minimal, if any, distortion on the read/write disks and reducing the clamp force variation.

What is claimed is:

1. A disk clamp for a disk drive, the disk drive including at least one storage disk supported on a hub of a motor, the disk clamp comprising:
a circular member having a center, a top surface, a bottom surface, and an outer diameter, a fastening hole located in the center of the circular member, a plurality of balance weight holes located in the circular member along a radius of the circular member around the fastening hole, each balance weight hole surrounded by a boss formed into the surface of the circular member forming a depression around each balance weight hole, thereby evening out the circumferential clamp force of the circular member.

2. The disk clamp of claim 1 wherein each surrounding boss has four sides.

3. The disk clamp of claim 2 wherein the top sides of each boss are co-radial.

4. The disk clamp of claim 2 wherein the bottom sides of each boss are co-radial.

5. The disk clamp of claim 2 wherein the sides of each boss are collinear with a radial extension from the center of the circular member.

6. The disk clamp of claim 1 wherein the depression of each boss formed into the circular member has a depth of 10%-30% of the thickness of the circular member.

7. The disk clamp of claim 1 wherein the depression of each boss formed into the circular member has an offset of 0.01 to 0.015 inches from the surface of the circular member.

8. The disk clamp of claim 1 wherein each boss is formed in the top surface of the circular member.

9. The disk clamp of claim 1 wherein each boss is formed in the bottom surface of the circular member.

* * * * *